(12) United States Patent
Elbers et al.

(10) Patent No.: US 7,116,454 B2
(45) Date of Patent: Oct. 3, 2006

(54) METHOD FOR DETERMINING SIGNAL QUALITY IN OPTICAL TRANSMISSION SYSTEMS

(75) Inventors: Joerg Peter Elbers, Munich (DE); Christoph Glingener, Feldkirchen-Westerham (DE); Andreas Faerbert, Munich (DE); Christian Scheerer, Ottawa (CA)

(73) Assignee: Siemens Aktiengesellschaft, Munich (DE)

( * ) Notice: Subject to any disclaimer, the term of this patent is extended or adjusted under 35 U.S.C. 154(b) by 784 days.

(21) Appl. No.: 10/095,890

(22) Filed: Mar. 11, 2002

(65) Prior Publication Data

US 2003/0011835 A1    Jan. 16, 2003

(30) Foreign Application Priority Data

Mar. 9, 2001  (DE) ................ 101 11 497

(51) Int. Cl.
*H04B 10/08*  (2006.01)
*H04B 17/00*  (2006.01)

(52) U.S. Cl. .................. 359/110; 398/25; 398/26; 398/27

(58) Field of Classification Search .......... 398/26, 398/25, 27
See application file for complete search history.

(56) References Cited

U.S. PATENT DOCUMENTS

| | | | |
|---|---|---|---|
| 6,396,601 B1 * | 5/2002 | Takara et al. ............ | 398/9 |
| 6,445,471 B1 * | 9/2002 | Shimokawa et al. ....... | 398/79 |
| 6,580,531 B1 * | 6/2003 | Swanson et al. .......... | 398/5 |
| 6,748,169 B1 * | 6/2004 | Geiger et al. ............ | 398/26 |
| 6,904,237 B1 * | 6/2005 | Rasztovits-Wiech et al. | 398/27 |

FOREIGN PATENT DOCUMENTS

| | | | |
|---|---|---|---|
| DE | 198 12 078 | 9/1999 | |
| DE | 195 04 856 | 5/2000 | |
| DE | 199 14 793 | 10/2000 | |
| WO | WO 00/41345 | * 7/2000 | ............ 398/27 |

OTHER PUBLICATIONS

I. Shake, H. takara, S. Kawanishi. Y. Yabayashi, "Optical signal quality monitoring method based on optical sampling", Oct. 29, 1998, Electronics Letters vol. 34 No. 22.*
M. Rasztovits-Weich, K. Struder and W.R. Leeb, "Bit error probability estimation algorithm for signal supervision in all-optical networks", Sep. 30, 1999, Electronics Letters vol. 35 No. 20.*
"An Improved OSNR Monitoring technique based on Polarization-Nulling Method" by J.H. Lee and Y.C. Chung.*
"A Novel Optical Signal-to-Noise Ration Monitoring Technique for WDM Networks" by S.K. Shin, K.J. Park, and Y.C. Chung.*
"Histogram Method for Performance Monitoring of the Optical Channel" by C.M. Weinert.*
XP-001087664—Weinert, "Histogram Method for Performance Monitoring of the Optical Channel", pp. 121-122.
XP-000886728—Shake et al., "Optical Signal Quality Monitoring Method Based on Optical Sampling", Electronics Letters Oct. 29, 1998, vol. 34, No. 22, pp. 2152-2154.

* cited by examiner

*Primary Examiner*—Kenneth Vanderpuye
*Assistant Examiner*—Ken Malkowski
(74) *Attorney, Agent, or Firm*—Bell, Boyd & Lloyd LLC

(57) ABSTRACT

A method for determining signal quality in optical transmission systems, wherein the effective signal-to-noise ratio is determined by measuring amplitude histograms of a signal and by calculating characteristic histogram moments and additional interference is ascertained by comparing the characteristic histogram moments with the optical signal-to-noise ratio.

10 Claims, 3 Drawing Sheets

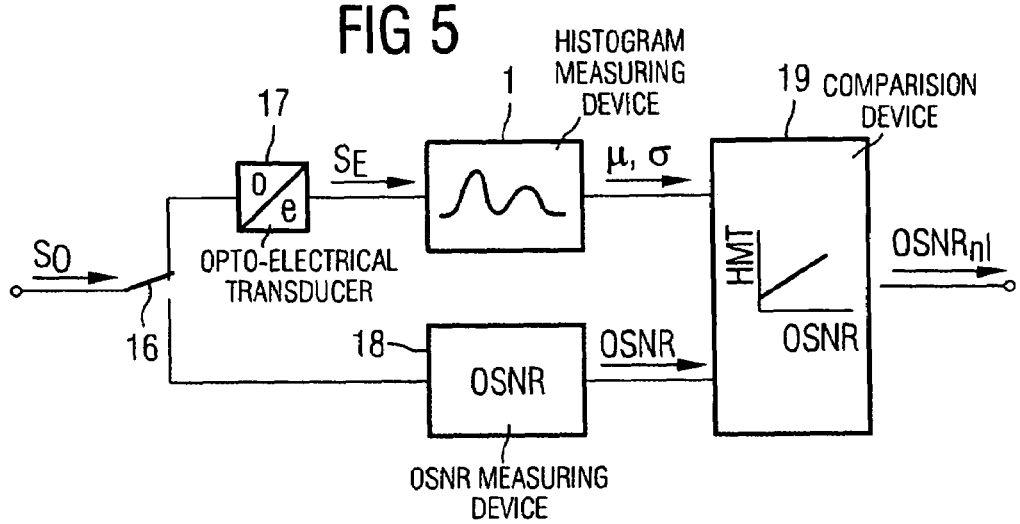
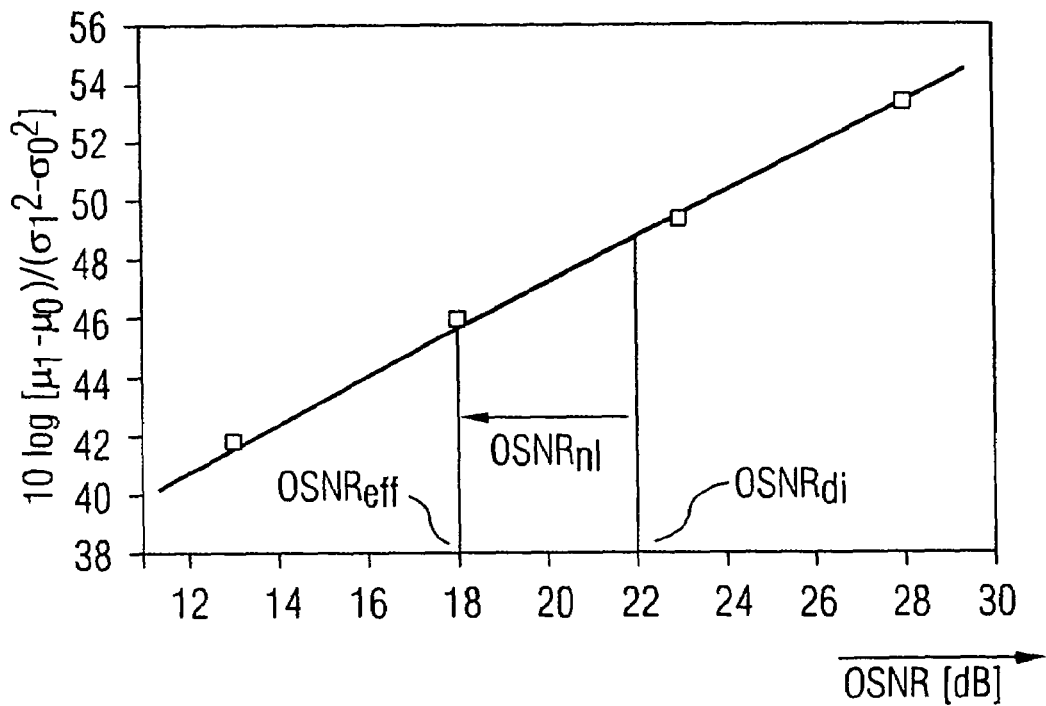

METHOD FOR DETERMINING SIGNAL QUALITY IN OPTICAL TRANSMISSION SYSTEMS

BACKGROUND OF THE INVENTION

The present invention relates to a method for determining the signal quality in optical transmission systems and for determining interfering effects.

In the future, transmission networks will be embodied as optical networks via which data will be transmitted at extremely high bit rates using the wavelength division multiplex method. In this context, extensive transparency of the networks is sought. However, in the required monitoring of the signal quality, it is then no longer possible to ascertain a violation of code rules; for example, in the case of error correcting codes. Therefore, methods are being developed which enable the signal quality to be assessed independently thereof.

In a method described in published patent application DE 195 04 856, amplitude samples are taken asynchronously with respect to the signal clock and the central moments of the sample are calculated therefrom. These are then compared with empirically obtained reference values in order to derive therefrom a statement about the signal quality.

Patent application DE 198 12 078 specifies a further method for determining the signal quality, which makes it possible to make reliable statements about the signal quality. In this method, the outer edges of a histogram which specifies the probability of the occurrence of different voltage values representing the logic states 0 and 1 are evaluated.

This method is developed further in an earlier application DE 199 14 793. In this case, the measuring arrangements allow not only a shift of the thresholds but also a shift of the sampling instants, as a result of which the eye opening can be determined. The determination of the distribution densities of the samples as a function of the amplitude values is effected by deriving a probability distribution which specifies the frequency of the occurrence of one of the two binary states as a function of the sampling threshold.

Attempts likewise are being made to obtain from the histograms knowledge about interfering influences on the transmission link. However, if different interfering effects occur simultaneously, the evaluation of the probability density distribution suffices for identifying and quantifying the effects. In the event of the simultaneous transmission of a number of signals, multichannel effects that occur, such as cross phase modulation (XPM), four wave mixing (FWM), stimulated Raman cross-talk (SRS-XT) and coherent/incoherent cross-talk (XT), all bring about, on statistical average, a Gaussian widening of the probability density distribution of sampling amplitudes and are, thus, indistinguishable.

It is an object of the present invention to specify a method with which the signal quality can be determined as well as the essential transmission properties. Furthermore, the present intention is to identify interfering effects and ascertain the magnitude thereof.

SUMMARY OF THE INVENTION

Accordingly, in an embodiment of the present invention, a method is provided for determining signal quality in optical transmission systems by measuring an amplitude histogram of a signal, wherein the method includes the steps of: calculating characteristic histogram moments for determining an effective signal-to-noise ratio; and assigning the characteristic histogram moments, for further determining the effective signal-to-noise ratio, to an optical signal-to-noise ratio of a transmission system that is not impaired by further interference effects.

In a further embodiment of the present invention, a method is provided for determining signal quality and optical transmission systems by measuring an amplitude histogram of a signal, wherein the method includes the steps of: calculating characteristic histogram moments to determine the signal quality; measuring an optical signal-to-noise ratio directly; comparing the characteristic histogram moments with the measured optical signal-to-noise ratio; and determining, if the comparison yields non-correspondence, a proportion of nonlinear noise.

A key advantage of the method according to the present invention is that histogram measurements can be used to infer the effective signal-to-noise ratio of a signal. An additional signal-to-noise ratio measurement can be used to make a reliable statement about the presence of additional interference effects, which then can be examined more precisely.

On the basis of calculations or comparative measurements with a system disturbed only by noise, it is possible to make statements about the magnitude of the additional interference influences.

Mathematical transformations, in particular, enable a simple comparison between measured histogram values and calculated or measured comparison values, since a histogram moments term containing average values and variances of the sampling amplitude distributions of the binary states is linearly dependent on the signal-to-noise ratio.

Additional features and advantages of the present invention are described in, and will be apparent from, the following Detailed Description of the Invention and the Figures.

BRIEF DESCRIPTION OF THE FIGURES

FIG. 5 shows a measuring arrangement.

FIG. 6 shows a histogram signal-to-noise ratio diagram.

DETAILED DESCRIPTION OF THE INVENTION

Figure 1:
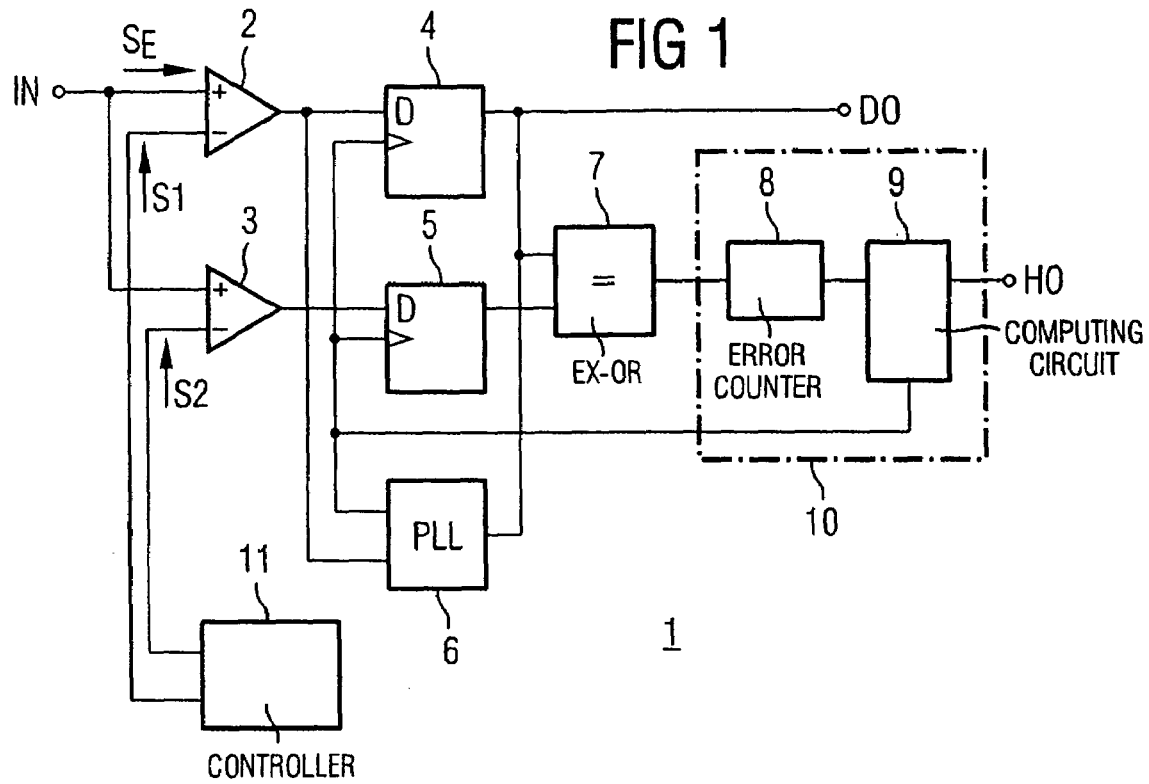
FIG. 1 shows a known measuring arrangement for generating amplitude histograms.

The known measuring device 1 for amplitude histograms which is illustrated in FIG. 1 serves for determining the probability density distribution of samples through measurements at different sampling thresholds.

The measuring device 1 contains two decision stages 2 and 3, to whose first inputs an already converted electrical signal $S_E$ is fed via a data signal input IN, the signal having been transmitted beforehand as an optical signal via a link section or the entire transmission link. The decision threshold of at least one of the decision stages 2 and 3 is adjustable via a controller 11; here through the application of comparison voltages corresponding to threshold values S1 and S2.

The outputs of the decision stages are respectively connected to a sampling flip-flop 4 and 5, whose data outputs are fed to an Exclusive-OR gate 7. The output of this gate is connected to an error counter 8 which, like a computing circuit 9, is part of a histogram computer 10.

Moreover, a clock regenerator 6 is provided, which regenerates the bit clock signal TS from the received data signal via a phase-locked loop.

The electrical signal $S_E$ is compared in parallel with different threshold values S1 and S2, sampled and stored as binary values. Different measurements can be carried out by the measuring device. One threshold value S1 may be kept constant as desired threshold value and the other threshold value S2 may be varied. The "errors" FE (different sampling states 0 and 1 in the sampling flip-flops; FIG. 1) which occur at different threshold values S2 are evaluated, a uniform distribution of logic zeros and ones being assumed or the distribution being measured. The errors related to the bits received overall yield the error rate distribution VF as a function of the threshold value S2, which distribution is represented by a broken line in FIG. 2. This can be converted into a probability density distribution VD; that is to say, into a sampling amplitude distribution for "0's" and "1's". The bars in the amplitude histogram in FIG. 2 specify the (relative) number of samples for the logic states "0" and "1" which occur between equidistant values. The average values are designated by $\mu_0$ and $\mu_1$ and the standard deviations (moments) are designated by $\sigma_0$ and $\sigma_1$. Amplitude histograms can be plotted as a function of the threshold value S2 or of the sampling amplitude A (voltage values or corresponding current values of an opto-electrical transducer). The relative frequencies P are, in each case, plotted on the ordinate. The sampling instant is kept constant. However, it is also possible to create histograms that are dependent on the threshold value and the phase angle of the sampling clock, but these will not be discussed in further detail in the exemplary embodiment.

Figure 2:
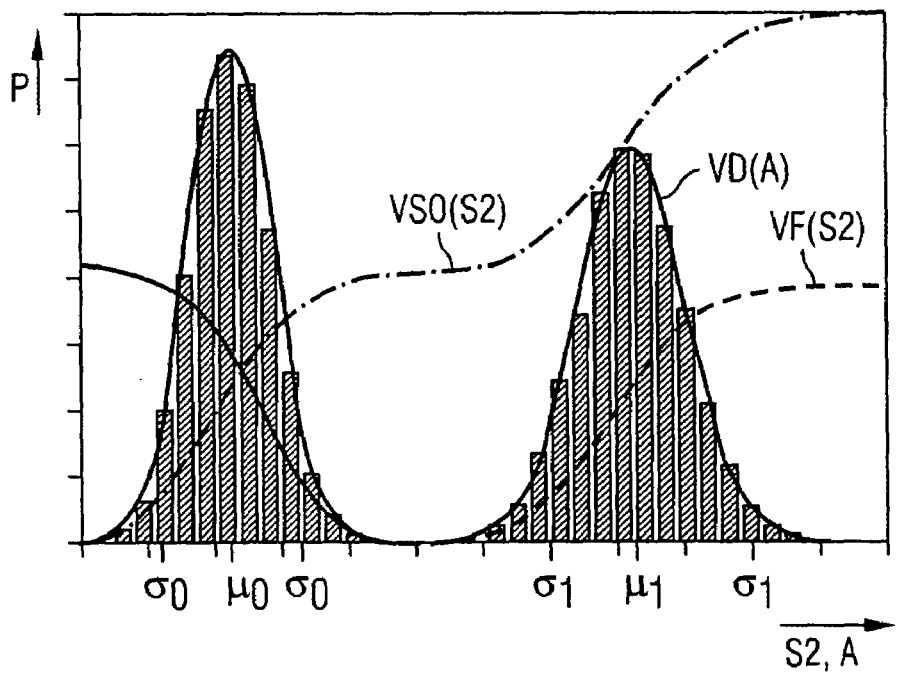
FIG. 2 shows an amplitude histogram.

It is also equally possible to determine expected values VS0 for the occurrence of logic zeros (or logic ones) in dependence on the variable threshold S2, which is represented by a dash-dotted line as normalized function VS0 in FIG. 2, and can be converted into the amplitude distribution VD by differentiation.

The sampled data signal is output at the data output DO, the characteristic histogram data in each case at the end of a sufficiently long measurement period at the output HO of the histogram computer.

It is likewise possible to measure the distribution of the sampling amplitudes directly. This requires a storage oscilloscope with an optical input or an opto-electrical transducer connected upstream which, at an adjustable sampling instant, records the received signal with regard to its amplitude (eye pattern) and statistically evaluates it.

For the further considerations it is possible to use each of the amplitude histograms, the error rate distribution FE, a probability distribution VS0 for a logic state and probability density distribution VD since these can be converted into one another.

In order to assess the signal or transmission quality, the amplitude histogram is recorded and the characteristic histogram moments, average values and variance are determined.

The effective signal-to-noise ratio can be determined therefrom, as will be explained. A further direct measurement of the signal-to-noise ratio via an optical spectrum analyzer and a comparison of this directly measured signal-to-noise ratio with the effective signal-to-noise ratio determined from the characteristic histogram moments may follow. If values which correspond to one another for an optimum system are present, the system has, except for the noise, no further interference influences.

However, if the effective signal-to-noise ratio determined from the amplitude histogram corresponds to a signal-to-noise ratio that is less than the directly measured signal-to-noise ratio, then additional impairments due to nonlinear effects are present.

The relationship between the characteristic moments $\mu$ and $\sigma$ of the histogram and the signal-to-noise ratio can be determined via measurements on an ideal system. It can be calculated equally on the basis of the explanations below. These will also clarify the relationships between the characteristic values of the histogram and the signal-to-noise ratio.

Figure 3:
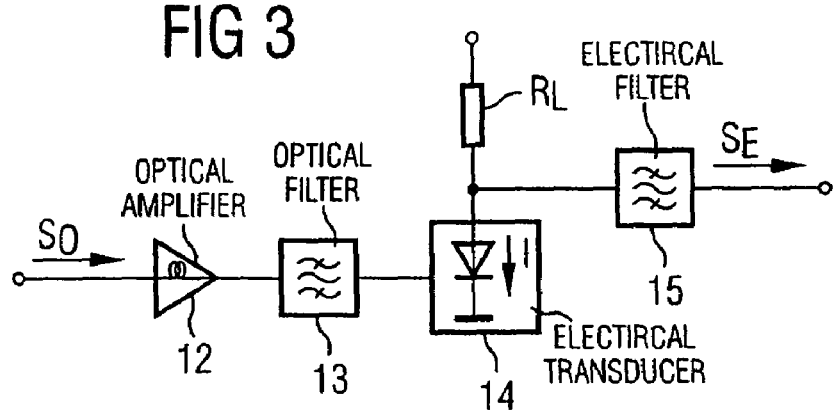
FIG. 3 shows a basic circuit diagram of an optical receiver.

FIG. 3 illustrates an input stage of an optical receiver as a basic circuit diagram. This contains an optical preamplifier 12, an optical filter 13, an opto-electrical transducer 14 and an electrical filter 15, which determines the electrical bandwidth.

The optical signal $S_0$ is fed to the optical preamplifier 12, amplified there and subsequently limited in its bandwidth by the filter 13. After conversion into an electrical voltage signal $S_E$, the latter is band-limited by an electrical filter 15 (the band limiting can be effected by circuit elements).

The photodiode currents corresponding to samples are used in the considerations below. The (e.g., received) signal $S_E$ to be measured includes the data signal and a noise component.

The photocurrent, corresponding to the signal, $I_E = I_S + \Delta I$ of a photodetector or opto-electrical transducer is the sum of the (useful) data signal component $I_S = \Re P_v(AA)$ and the noise component $\Delta I$.

For its part, the data signal component $I_S$ is dependent on the detector sensitivity $\Re = \eta q/h\nu$ (where $\eta$=quantum efficiency, q=elementary charge, h=quantum of action, v=frequency of the signal) and the amplified signal power $P_v = GP_S + P_{sp}$. The signal power P is, in turn, composed of the signal power $P_S$ and the proportion caused by spontaneous emission $P_{sp}$. In this case, G corresponds to the gain factor of the optical amplifier 12. The power of the spontaneous emission, with $P_{sp} = 2S_{sp}B_{opt}$, results from the spectral density $S_{sp}$ thereof and the optical bandwidth $B_{opt}$ limited on account of an optical filter 4 upstream of the photodiode. (G. P. Agrawal, Fiber Optic Communication Systems, 2nd Edition, pp. 404 to 406)

The noise component $\Delta I$ is composed of the proportions of thermal noise, shot noise and noise due to spontaneous emission processes. The individual noise power contributions (noise current contributions) or variance contributions such as the thermal noise $$\sigma_{th}^2,$$

the shot noise $$\sigma_{sh}^2$$

and the so-called beat noise of the spontaneous emission through mixing with itself $$\sigma_{sp-sp}^2$$

and with the useful signal $$S \quad \sigma_{S-sp}^2$$

add up, assuming a Gaussian distribution, to form a total variance $\sigma^2 = \langle \Delta I^2 \rangle$. (G. P. Agrawal, Fiber Optic Communication Systems, 2nd Edition, pp. 404 to 405; J. H. Winters, R. D. Gitlin, IEEE Trans. On Communication, 38, pp. 1439 to 1453)

$$\sigma^2 = \sigma_{th}^2 + \sigma_{sh}^2 + \sigma_{sp-sp}^2 + \sigma_{S-sp}^2 \qquad (1)$$

the constituents can be described by [3]:

$$\sigma_{th}^2 = 4k_B T F B_{el} / R_l \qquad (2)$$

$$\sigma_{sh}^2 = 2q[\mathcal{R}(GP_S + P_{sp}) + I_d] B_{el} \qquad (3)$$

$$\sigma_{sp-sp}^2 = 4\mathcal{R}^2 S_{sp}^2 B_{opt} B_{el} \qquad (4)$$

$$\sigma_{S-sp}^2 = 4\mathcal{R}^2 GP_S S_{sp} B_{el} \qquad (5)$$

In this case, in detail: $k_B$ is Boltzmann's constant, T is the absolute temperature, F is the noise figure of the optical amplifier, $B_{el}$ describes the electrical bandwidth of the photodiode, $R_l$ takes account of the charging resistance, q is the elementary charge, $I_d$ is the dark current of the detector, $S_{sp}$ is the spectral density of the spontaneous emission and $B_{opt}$ corresponds to the optical bandwidth (usually determined by the optical demultiplexer).

The optical signal-to-noise ratio (OSNR) at the input of the photodiode is determined by the noise behavior of the optical preamplifier. The OSNR at the output of an optical amplifier OV can be calculated by [G. P. Agrawal, Fiber Optic Communication Systems, 2nd Edition, pp. 365, 366; Yariv, Opt. Letters 1, (1990), pages 1064–1064]:

$$OSNR = \frac{\langle P \rangle_{av}}{2 S_{sp} B_{opt}^{OSNR}} \qquad (6)$$

with the average signal power $\langle P \rangle_{av}$ and the optical bandwidth $$B_{opt}^{OSNR},$$

to which the OSNR value relates. Consequently, the value to be measured, the OSNR present at the input of the photodiode, can be introduced into equations (3)–(5):

$$\sigma_{sh}^2 = 2q\left[\mathcal{R}\left(GP_S + \frac{\langle P \rangle_{av} B_{opt}}{OSNR \cdot B_{opt}^{OSNR}}\right) + I_d\right] B_{el} \qquad (7)$$

$$\sigma_{sp-sp}^2 = \mathcal{R}^2 \left(\frac{\langle P \rangle_{av}}{OSNR \cdot B_{opt}^{OSNR}}\right)^2 B_{opt} B_{el} \qquad (8)$$

$$\sigma_{S-sp}^2 = 2\mathcal{R}^2 GP_S \frac{\langle P \rangle_{av}}{OSNR \cdot B_{opt}^{OSNR}} B_{el} \qquad (9)$$

The average values $\mu_0$, $\mu_1$ and standard deviations $\sigma_0$, $\sigma_1$ and variances $\sigma_0^2$, $\sigma_1^2$ (square of the standard deviations) of the Gaussian distributions are, in each case, determined for both binary states, "0" and "1".

The unadulterated signal current component $I_{S\_0,1} = \mathcal{R} GP_{S\_0,1}$ in equations (7) and (9) thus can be replaced by the respective average values $\mu_0$, $\mu_1$. As a result of the formation of the difference in the total variance (1) of the distributions of the "0's" and "1's", the contributions (2) and (4), which are independent of signal levels corresponding to the logic states of the data signal, cancel one another out and the following is obtained from (7) and (9):

$$\sigma_1^2 - \sigma_0^2 = 2q\mu_1 B_{el} + 2\mathcal{R}\mu_1 \frac{\langle P \rangle_{av} B_{el}}{OSNR \cdot B_{opt}^{OSNR}} - 2q\mu_0 B_{el} - \qquad (10)$$

$$2\mathcal{R}\mu_0 \frac{\langle P \rangle_{av} B_{el}}{OSNR \cdot B_{opt}^{OSNR}} = \left(2q B_{el} + 2 \frac{\mathcal{R}\langle P \rangle_{av} B_{el}}{OSNR \cdot B_{opt}^{OSNR}}\right)(\mu_1 - \mu_0)$$

and hence $$\frac{\sigma_1^2 - \sigma_0^2}{\mu_1 - \mu_2} = 2\left(q + \frac{\mathcal{R}\langle P \rangle_{av}}{OSNR \cdot B_{opt}^{OSNR}}\right) B_{el} \qquad (11)$$

The free parameters on the right-hand side of (11) must be known, but also can be determined by a reference measurement given a known signal-to-noise ratio. In optically preamplified systems the contribution of the shot noise can be disregarded, so that the term $2qB_{el}$ on the right-hand side of (11) can be omitted. A simplified relationship between OSNR and measured average values and variances is thus produced:

$$10 \lg\left(\frac{\mu_1 - \mu_0}{\sigma_1^2 - \sigma_0^2}\right) = 10 \lg(OSNR) - 10 \lg\left(\frac{2\mathcal{R}\langle P \rangle_{av} B_{el}}{B_{opt}^{OSNR}}\right) \qquad (12)$$

This corresponds to a linear equation in a logarithmic representation. In the case of a system disturbed only by optical noise, the signal-to-noise ratio therefore can be determined by calculating the characteristic values of the histogram. The first term of equation 12 is referred to below as histogram moments term HMT.

Figure 4:
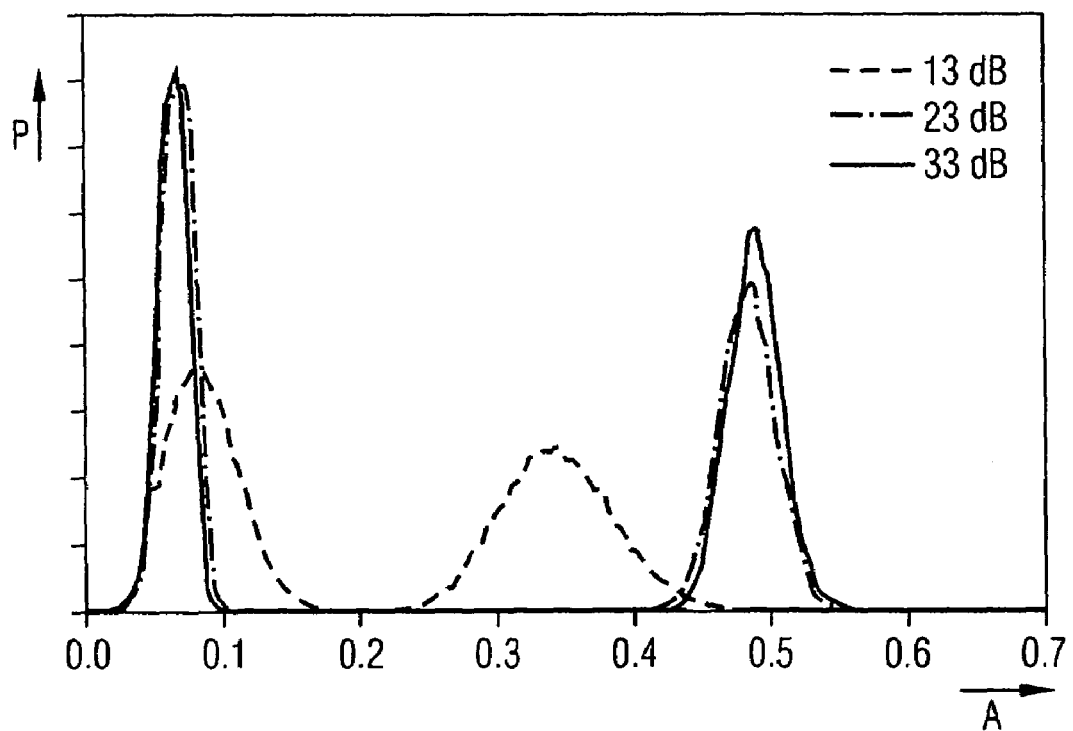
FIG. 4 shows amplitude histograms for different signal-to-noise ratios.

Histograms for various signal-to-noise ratios are indicated in FIG. 4. Smaller signal-to-noise ratios lead to maxima that are spread further apart but are flatter.

From the average values $\mu_0$ and $\mu_1$ of the Gaussian distributions for logic 0's and 1's and their variances $\sigma_0^2$, $\sigma_1^2$ for various signal-to-noise ratios, it is possible to determine the resultant straight line for the distributions by minimizing the squares of the deviations. The function described by equation (12) is illustrated in the signal-to-noise ratio histogram moments diagram of FIG. 6.

The calculated reference straight line, or one determined by measurements, can be used for evaluating present histograms.

In the case of a system which is free of nonlinear effects (and other effects which do not influence the amplitude histograms, apart from noise), the signal-to-noise ratio can, therefore, be determined using the reference straight line by measuring the characteristic values of the histogram. Measurements for different signal levels or signal-to-noise ratios, apart from measurement errors or inaccuracies, all lie on the reference straight line.

It generally is not known whether nonlinear effects occur which influence the histogram and reduce the "effective" signal-to-noise ratio. Therefore, the method is designated more exactly as determination of the effective signal-to-noise ratio $OSNR_{\it eff}$. In the absence of the interfering (nonlinear) effects including cross-talk between a number of channels, the measurement yields the signal-to-noise ratio directly. As mentioned above, due to the statistical properties of some nonlinear effects, the latter act like an additional noise contribution $\sigma^2_{nl}$ which produces an increased effective variance $\sigma^2_{\it eff}$ in the amplitude histogram:

$$\sigma^2_{\it eff} = \sigma^2_{th} + \sigma^2_{sh} + \sigma^2_{sp-sp} + \sigma^2_{S-sp} + \sigma^2_{nl} \quad (13)$$

The total "effective signal-to-noise ratio" $OSNR_{\it eff}$ consequently can be determined via average values $\mu_0$ and $\mu_1$ and the variances $\sigma_0^2$ and $\sigma_1^2$ of the amplitude distributions of the "0's" and "1's", and the noise component of the nonlinear effects (likewise cross-talk in the case of multichannel systems) can be determined by comparison with the calculated values of a system having no nonlinear or interfering effects.

Instead of a calculation, the optical signal-to-noise ratio $OSNR_{di}$ can be measured directly.

FIG. 5 illustrates a corresponding arrangement. The latter contains measuring device 1, a further signal-to-noise ratio measuring device 18 and a comparison device 19 for the evaluation of the measured values.

The binary optical signal $S_0$ is first fed via a switch 16 and an opto-electrical transducer 17 to the measuring device 1, which records the amplitude histogram and determines the histogram moments. The optical signal-to-noise ratio OSNR is then measured directly by the signal-to-noise ratio measuring device 18 (optical spectrum analyzer), in which case all known measurement methods can be employed and, if appropriate, at least the transmission of some signals is interrupted. The measurement results are evaluated in the comparison device 19.

If the value on the reference straight line which is determined from the histogram corresponds to the directly measured optical signal-to-noise ratio, no interfering effects are present. By contrast, if the value on the reference straight line which is determined from the histogram moments in FIG. 6 on the left lies below the directly measured signal-to-noise ratio $OSNR_{di}$, then the difference $OSNR_{nl}$ is caused by additional interference effects and it is possible to search for the causes, such as cross phase modulation (XPM), four wave mixing (FWM), stimulated Raman cross-talk (SRS-XT) and coherent/incoherent cross-talk (XT), and also further causes such as self phase modulation (SPM) and polarization mode dispersion (PMD).

As already mentioned, the determination of the signal-to-noise ratio need not be effected using a representation according to FIG. 6, but rather can be carried out using non-logarithmic diagrams, tables, or using the calculated values etc.

It should also be added that the histograms and thus the determinations of the signal-to-noise ratio are largely independent of the dispersion.

Indeed, although the present invention has been described with reference to specific embodiments, those of skill in the art will recognize that changes may be made thereto without departing from the spirit and scope of the invention as set forth in the hereafter appended claims.

The invention claimed is:

1. A method for determining signal quality in optical transmission systems by measuring an amplitude histogram of a signal, the method comprising the steps of:
   calculating characteristic histogram moments from the measured amplitude histogram;
   measuring directly an optical signal-to noise ratio from the signal;
   comparing the characteristic histogram moments with the measured optical signal-to-noise ratio; and
   determining, a proportion of non-linear noise if the comparison yields non-correspondence, wherein a relationship between the characteristic histogram moments and signal-to-noise ratio is determined using the following:

$$10 lg\left(\frac{\mu_1 - \mu_0}{\sigma_1^2 - \sigma_0^2}\right) = 10 lg(OSNR) - 10 lg\left(\frac{2\mathcal{R}\langle P\rangle_{av} B_{el}}{B_{opt}^{OSNR}}\right)$$

or $$\left(\frac{\mu_1 - \mu_0}{\sigma_1^2 - \sigma_0^2}\right) = (OSNR) \bigg/ \left(\frac{2\mathcal{R}\langle P\rangle_{av} B_{el}}{B_{opt}^{OSNR}}\right).$$

where $\mu_0$ and $\mu_1$ are average values of the amplitude distribution of the logic "1's" and "0's", $\sigma_0$ and $\sigma_1$ are standard deviations of the amplitude distribution of the logic "1's" and "0's", OSNR is signal-to-noise ratio, $<P>_{av}$ is an average signal power, $$B_{opt}^{OSNR}$$

is an optical bandwidth, $B_{el}$ is an electrical bandwidth of a photodiode or an opto-electrical transducer, and $\mathcal{R}=\eta q/h\nu$ is detector sensitivity ($\eta$=quantum efficiency, q=elementary charge, h=quantum of action, $\nu$=frequency of the signal).

2. A method for determining signal quality in optical transmission systems by measuring an amplitude histogram of a signal as claimed in claim 1, the method further comprising the steps of:
   determining a difference between the average values of the amplitude distributions regarded as Gaussian distribution for logic "1's" and logic "0's";
   determining a difference between variances of the amplitude distributions for logic "1's" and logic "0's"; and
   determining a histogram moments term by forming a quotient from the two differences.

3. A method for determining signal quality in optical transmission systems by measuring an amplitude histogram of a signal as claimed in claim 1, wherein, as the amplitude histogram, measurement is made of one of an error rate distribution in dependence on a variable sampling threshold, or a distribution density of logic "0's" or logic "1's" in dependence on the variable sampling threshold, or a probability density distribution of sampling amplitudes of logic "0's and logic "1's," and wherein the characteristic histogram values are respectively determined in each case.

4. A method for determining signal quality in optical transmission systems by measuring an amplitude histogram of a signal as claimed in claim 1, wherein the corresponding histogram moments are calculated in dependence on a signal-to-noise ratio of a transmission system having no link interference influences.

5. A method for determining signal quality in optical transmission systems by measuring an amplitude histogram of a signal as claimed in claim 1, wherein the corresponding histogram moments are calculated in dependence on a signal-to-noise ratio without link interference influences for an optimum system.

6. A method for determining signal quality in optical transmission systems by measuring an amplitude histogram of a signal as claimed in claim 3, wherein the corresponding histogram moments and associated signal-to-noise ratios are stored.

7. A method for determining signal quality in optical transmission systems by measuring an amplitude histogram of a signal as claimed in claim 4, wherein the corresponding histogram moments and associated signal-to-noise ratios are stored.

8. A method for determining signal quality in optical transmission systems by measuring an amplitude histogram of a signal as claimed in claim 2, wherein a function of the corresponding histogram moments is stored in dependence on the signal-to-noise ratio.

9. A method for determining signal quality in optical transmission systems by measuring an amplitude histogram of a signal as claimed in claim 3, wherein a function of the corresponding histogram moments is stored in dependence on the signal-to-noise ratio.

10. A method for determining signal quality in optical transmission systems by measuring an amplitude histogram of a signal as claimed in claim 1, wherein the term $$\left( \frac{2\mathcal{R}\langle P \rangle_{av} B_{el}}{B_{opt}^{OSNR}} \right)$$

is determined by measurement.

* * * * *